(12) United States Patent
Kopf

(10) Patent No.: US 7,088,744 B2
(45) Date of Patent: Aug. 8, 2006

(54) LASER FOR USE IN NON-LINEAR OPTICS

(75) Inventor: Daniel Kopf, Sandholzerstrasse 14, A-6844 Altach (AT)

(73) Assignee: Daniel Kopf, Altach (AT)

( * ) Notice: Subject to any disclaimer, the term of this patent is extended or adjusted under 35 U.S.C. 154(b) by 498 days.

(21) Appl. No.: 10/332,847

(22) PCT Filed: Jul. 27, 2001

(86) PCT No.: PCT/EP01/08752

§ 371 (c)(1), (2), (4) Date: May 29, 2003

(87) PCT Pub. No.: WO02/11252

PCT Pub. Date: Feb. 7, 2002

(65) Prior Publication Data

US 2003/0179786 A1    Sep. 25, 2003

Related U.S. Application Data

(60) Provisional application No. 60/221,608, filed on Jul. 28, 2000.

(51) Int. Cl.
*H01S 3/11* (2006.01)
*H01S 3/098* (2006.01)
*H01S 3/10* (2006.01)

(52) U.S. Cl. .............................. 372/10; 372/18; 372/21

(58) Field of Classification Search .................. 372/10, 372/18
See application file for complete search history.

(56) References Cited

U.S. PATENT DOCUMENTS

| 6,016,324 | A | 1/2000 | Rieger et al. |
| 6,252,892 | B1 | 6/2001 | Jiang et al. |

FOREIGN PATENT DOCUMENTS

| DE | 199 42 954 A1 | 4/2000 |
| EP | 0 541 304 A1 | 5/1993 |
| WO | WO 00/77893 A2 | 12/2000 |

OTHER PUBLICATIONS

D. Kopf et al. "High-average-power diode-pumped femtosecond Cr:LiSAF lasers" Applied Physics B 65; 1997; pp. 235-243.
Honninger et al., "Q-switching stability limits of continuous-wave passive mode locking", J. Opt. Soc. Am. B, vol. 16, No. 1, pp. 46-56, 1999.

(Continued)

*Primary Examiner*—Armando Rodriguez
(74) *Attorney, Agent, or Firm*—Oliff & Berridge, PLC

(57) ABSTRACT

The combination of coupling modes and a Q-switch allows amplitude modulated laser pulses to be produced which contain a high output capability and high repetitive rate. The envelope of the pulse of the coupling modes in the shape of a Q-switch-pulse varies in intensity. Preferably, said combination is achieved by using a saturable semiconductor absorber mirror (SESAM), whereby the parameters thereof must be specially adjusted to the other elements used, so that the requirement for high repetitive Q-switch-pulse rates can be met.

31 Claims, 2 Drawing Sheets

OTHER PUBLICATIONS

Ursula Keller et al., "Semiconductor Saturable Absorber Mirrors (SESAM's) for Femtosecond to Nanosecond Pulse Generation in Solid-State Lasers," IEEE Journal of Selected Topics in Quantum Electronics, IEEE Service Center, US, vol. 2, No. 3, Sep. 1, 1996, pp. 435-451.

N. Kishi et al., "Actively Mode-Locked and Passively Q-Switched Operation of Thulium-Doped Fibre Laser Using Multiquantum Well Asymmetric Fabry-Perot Modulator," Electronics Letters, IEEE Stevenage, GB, vol. 28, No. 2, Jan. 16, 1992, pp. 175-177.

A.C. Maciel et al., "Simultaneous Modelocking and Q-Switching of a $Co:MgF_2$ Laser By Loss-Modulation Frequency Detuning," Optics Communications, North-Holland Publishing Co., Amsterdam, NL Jan. 15, 1987, vol. 61, No. 2, pp. 125-128.

LASER FOR USE IN NON-LINEAR OPTICS

The application is a §371 application based on PCT Application No. PCT/EP01/08752, filed Jul. 27, 2001, which in turn claims the benefit of U.S. Provisional Application No. 60/221,608, filed Jul. 28, 2000.

The invention relates to a laser having a high output power and high repetition rate for use in non-linear optics as claimed in the preamble of claim 1, a method for producing laser pulses as claimed in the preamble of claim 15, a use of a laser for producing UV emissions as claimed in claim 18 and a frequency conversion light source as claimed in claim 19.

Solid-state lasers having high peak outputs are used in many applications. The high output power is particularly suitable for utilizing non-linear optical effects. For example, it is possible to produce UV light by guiding the emission of an Nd:YAG or Nd:vanadate laser with a Q-switch through two non-linear optical crystals with a narrow focus within these crystals. The third harmonic is generated thereby which leads to a strong emission with frequency tripling and a wavelength of 355 nm. In a similar manner, it is also possible to produce 266 nm or even shorter wavelengths. Such Q-switch lasers can be pumped by means of flash lamps or laser diodes.

However, these lasers have the disadvantage that the repetition rate of the pulses is limited to a range of up to a few tens of kilohertz, unless a substantial reduction in the peak power is accepted. In order to achieve higher repetition rates at high output powers, Nd:YAG- or Nd:vanadate-based lasers are operated by means of mode-locking. However, these lasers usually have substantially longer resonators of the order of magnitude of 1.5 m or longer and are therefore not suitable for applications requiring particular compactness. On the other hand, achievable peak output power decreases if resonators for continuous-wave (cw) mode-locking are designed to be shorter.

The simultaneous and accidental occurrence of mode-locking and Q-switch is known from the prior art and is felt to be problematic since the special mode-locking or Q-switch properties desired in each case are adversely affected. Consequently, efforts are being made to avoid the occurrence of a mixed mode comprising mode-locking and Q-switch (cf. C. Hönniger et al., "Q-switching stability limits of continuous-wave passive mode-locking", J. Opt. Soc. Am. B/Vol. 16, No. 1/January 1999).

U.S. Pat. No. 6,252,892 discloses, for example, a resonant Fabry-Perot saturable absorber (R-FPSA) which affects mode-locking in a laser. A two-photon absorber (TPA) is especially used in order to prevent a parallel occurrence of Q-switching.

On the one hand, particularly for applications in the area of non-linear optics, mode-locked or Q-switched lasers of the prior art are subject to a compromise between high pulse rate and high pulse power, which is additionally subject to design restrictions. On the other hand, in the case of lasers of the prior art, attempts are made absolutely to avoid a resultant combination of mode-locking and Q-switching.

An object of the invention is to provide a laser source simultaneously having high pulse repetition rates greater than 100 kHz and high output power or peak power, which laser source is suitable in particular for utilizing non-linear optical effects, such as, for example, UV generation or two-photon or multiphoton absorption.

A further object of the invention is to provide a laser source which is at least comparable in terms of its power with mode-locked lasers to date but nevertheless permits a more compact design.

These objects are achieved, according to the invention, by the defining features of claims 1 to 15, respectively. Advantageous and alternative embodiments and further developments of the apparatus and of the method are evident from the features of the subclaims.

The invention is based on the concept of achieving, by a combination of Q-switch and mode-locking, a compact laser design which combines high pulse repetition rates of more than 100 kHz with simultaneous, high output powers. The laser emission can particularly advantageously be used for utilizing non-linear optical effects.

One embodiment comprises a diode-pumped solid-state laser having a particularly compact resonator (length <0.75 m), which includes a saturable absorber and which is operated in a mode which represents a combination of Q-switch and mode-locking, the time between the mode-locked pulses being in the nanosecond range and corresponding to the resonator revolution time, while the repetition rate of the Q-switch pulses is of the order of magnitude of a few hundred kilohertz and leads to a modulation of mode-locked pulses in which the Q-switch pulses represent the envelope of the mode-locked pulses. This combination of Q-switch and mode-locking leads to a sequence of ultra-short pulses. Since the emittable power approximately corresponds to the integral over the pulse duration, there is a relationship between pulse height and pulse duration. With this design, it is therefore possible to achieve peak powers in the region of a few kW. With this power and the possible, compact design, the laser is suitable in particular for applications of non-linear optics and for applications with particular requirements for the size of the laser used.

In mode-locked lasers, the pulse repetition rate is determined by the resonator revolution time, which in turn depends on the cavity length. On the other hand, the repetition rate of the pulses of Q-switch lasers is determined via the pulse build-up, especially by the following points:

A pulse build-up begins only when the inversion is pumped up to such an extent that the amplification associated therewith compensates the revolution losses. In the preferred embodiment, the revolution losses comprise the sum of the proportions of the losses due to coupling out, modulation depth of the saturable semiconductor absorber and further losses. This means that lower revolution losses lead to a higher repetition rate of the Q-switch pulses.

This is offset by the power pumped into the laser medium. With increasing power, i.e. pump intensity, the repetition rate of the pulse also increases.

The occurrence of noise-free operation of a laser with mode-locking and Q-switch cannot always be expected but can be achieved if, as a rough estimate, at least one photon from a preceding pulse remains in the resonator and initiates the pulse build-up.

From the mathematical relationship between the individual quantities, it follows as a condition that $$\frac{E_{Photon}}{h \cdot v} \cdot (1 - loss)^{\frac{T_{qs}}{T_{res}}} > 1$$

where the fraction on the left indicates the number of photons, "loss" denotes the revolution losses and $T_{qs}$ and $T_{res}$ denote the period of the Q-switch pulse and the resonator revolution time, respectively. In order to obtain the intended noise-free repetition rate of the Q-switch envelopes of mode-locking, this condition must be fulfilled.

The laser according to the invention is described in detail below purely by way of example with reference to embodiments shown schematically in the drawing. Specifically, FIG. 1 shows the schematic diagram of the design of a laser according to the invention, with a subsequent use for frequency multiplication of the emitted light in the UV range;

FIG. 3 shows the diagram for the measurement of an MLQSW pulse series of a laser according to the invention and FIG. 4 shows the schematic diagram of a possible application of a laser according to the invention for curing UV-sensitive synthetic resin or for optical data storage in three dimensions or the like.

Figure 1:
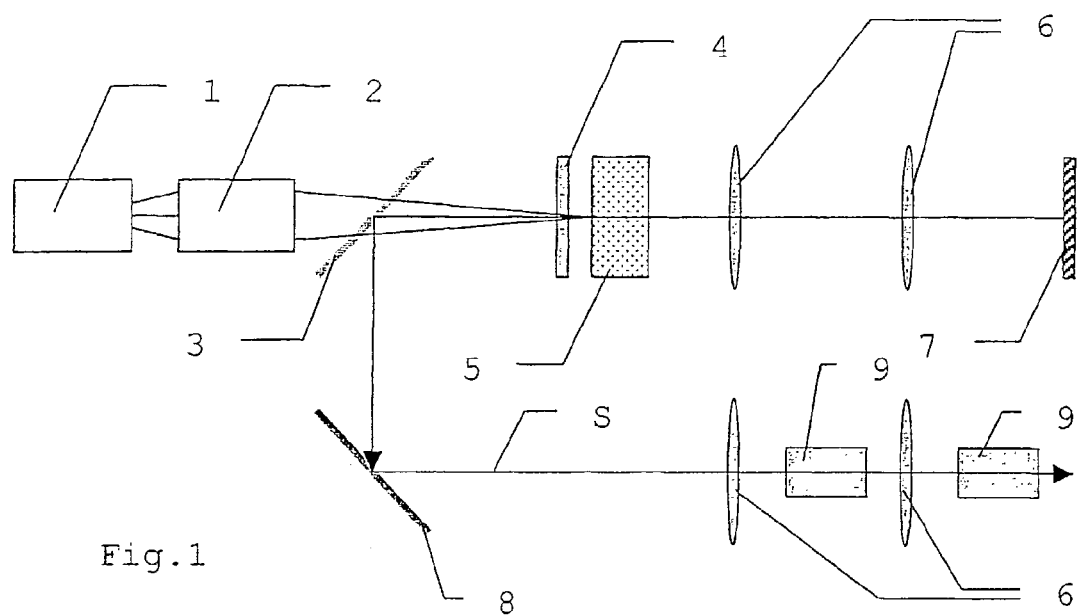
FIG. 1 shows the schematic design of a mode-locked Q-switch (MLQSW) laser and the possible design of an arrangement for utilizing non-linear optical effects with the use of the MLQSW laser according to the invention, e.g. for frequency multiplication in a frequency conversion light source according to the invention.

The laser substantially comprises a pump laser source 1, e.g. a laser diode, which pumps, via a transmission optical system 2 and a dichroic mirror 3, a laser medium 5 which is part of the laser resonator, it also being possible for the laser medium 5 to represent one end of the resonator. The resonator has the laser mirrors 4 and 7 and optionally further beam- or mode-forming optical elements 6 and at least one saturable absorber element, e.g. a saturable semiconductor (SESAM) which produces mode-locked Q-switch operation of the laser. In this example, the saturable semiconductor is part of the mirror 7, while the mirror 4 serves for coupling out from the resonator. The light of the pump laser source 1 is focused into the laser medium 5 by a transmission optical system 2. The volume excited in the laser medium 5 is substantially positioned within the laser mode which is defined by the mirrors 4 and 7 of the laser resonator. The mirror 4 is partly reflecting in the region of the laser wavelength and thus serves as a coupling-out device. The mode-locked Q-switch laser emission S is passed, in the further course after detection by the mirror 8, through a setup comprising a non-linear optical system 9 for frequency conversion of the laser emission, it once again being possible to use further beam-forming optical elements 6. As an alternative, it is also possible to use the laser emission for focusing into a medium in which two-photon or multiphoton effects locally change the properties of this medium.

Subsequent frequency conversion of a laser beam from a compact MLQSW laser: The efficiency of a frequency conversion is determined by the peak power of the incident laser beam. An MLQSW laser therefore has the advantage of achieving a higher efficiency than a comparable mode-locked (i.e. with the same cavity length) or Q-switch laser.

Generation of the second harmonic: This advantage is utilized, for example, in the case of the generation of the second harmonic. For example, a mode-locked Q-switch laser which is operated at a wavelength in the range of 750 nm . . . 980 nm (that is, for example, with a diode-pumped MLQSW CR:LiSAF, Cr:LiCAF, Cr:LiSGAF, Nd:YAG, Nd:vanadate or alexandrite laser which emits with the corresponding line) can produce a frequency conversion in the blue range by a single passage through a non-linear optical medium. Such media are, for example, lithium triborate, potassium niobate, etc.

Generation of the third harmonic: In comparison with the generation of the second harmonic, the conversion efficiency of the generation of the third harmonic is even more dependent on the peak power. An efficient UV laser can therefore be obtained by using a mode-locked Q-switch Nd:vanadate laser which is frequency-converted in a sequence of two lithium triborate crystals. The first crystal generates 532 nm laser light from the incident 1064 nm laser light, and the second crystal mixes the 532 nm and the 1064 nm light to effect an efficient frequency conversion into a wavelength of 355 nm. The UV beam (355 nm) can then be used, for example, in an embodiment and can carry in the middle, for scanning, a focused laser beam through a synthetic resin which cures on exposure to 355 nm light. In this way, three-dimensional structures can be produced in the synthetic resin. This laser is therefore suitable for stereolithographic applications in which a three-dimensional pattern of cured synthetic resin is produced inside liquid synthetic resin. Owing to the high achievable repetition rate of >100 kHz, there are only a few restrictions compared with the Q-switch lasers with their repetition rates of a few tens of kHz, with respect to the speeds at which the beam is passed through the synthetic resin. In order to control the structure writing process in the medium, an optical switch can be used in the laser beam part.

In an alternative form of implementation, a tunable diode-pumped MLQSW laser, such as, for example, with Cr:LiSAF, can be used in order to obtain tunable UV light with a high degree of compactness and frequency conversion efficiency at high frequencies.

Generation of fourth and higher harmonics by non-linear optics: The MLQSW laser can also be used for generating fourth, fifth or higher harmonics, with the result that light having a high intensity and wavelengths in the ultraviolet or deep ultraviolet range is produced. The fourth harmonic of an MLQSW Nd:vanadate laser produces light of a wavelength of 266 nm and the fifth harmonic light of 213 nm if suitable non-linear optical materials, such as, for example, the borates $BaB_2O_4$ (BBO), $LiB_3O_5$ (LBO) or $CsLiB_6O_{10}$ (CLBO) are used for frequency conversion.

MLQSW optical-parametric generation: The non-linear optical process of optical-parametric generation (OPG), of optical-parametric oscillation (OPO) or of optical-parametric amplification (OPA) can be used in combination with an MLQSW laser for achieving frequency shifts. For example, these processes can be used for obtaining visible light, for example the colors red, green and blue, which can be used for laser displays or applications in entertainment electronics. Similarly, "colors" which can be used for applications in molecular sensors or gas sensors can be produced in the infrared range. The achievable compactness of the MLQSW laser is in turn the basis for high compactness of the overall system. The subsequent optical-parametric oscillation has an optical length which is identical to the MLQSW laser length and is therefore as short as the length of the MLQSW laser resonator, resulting in a compact system.

Two-photon or multiphoton absorption effects: The MLQSW laser can also be used in combination with two-photon or multiphoton absorption effects in a multiplicity of materials. This may be, for example, multiphoton stereolithography, in which the curing of the synthetic resin is effected by two-photon or multiphoton absorption. Similarly, optical two-photon storage media can be written on by means of MLQSW lasers. Here, the high repetition rate of the Q-switch envelope of the mode-locked pulses leads to high achievable write rates compared with Q-switch lasers. In addition, the higher peak power results in in [sic] more efficient and faster writing and/or a lower current requirement. In particular, the MLQSW laser can be readily used in combination with any non-linear optical process or any non-linear optical application which has a power index proportional to $$\left(\frac{E_p^3}{t_p^2}\right) \cdot f_{rep}$$

or to $$\left(\frac{E_p^n}{t_p^{n-1}}\right) \cdot f_{rep},$$

where $E_p$ denotes the energy per pulse, $t_p$ the pulse duration, $f_{rep}$ the repetition rate of the pulses and where n>2. Owing to the high pulse energy and the short pulse duration of MLQSW lasers, the power index achieved is substantially higher than that achievable with comparable continuous-wave mode-locked or Q-switch lasers. In addition, the MLQSW laser can be kept more compact and simpler than the other lasers.

Figure 2:
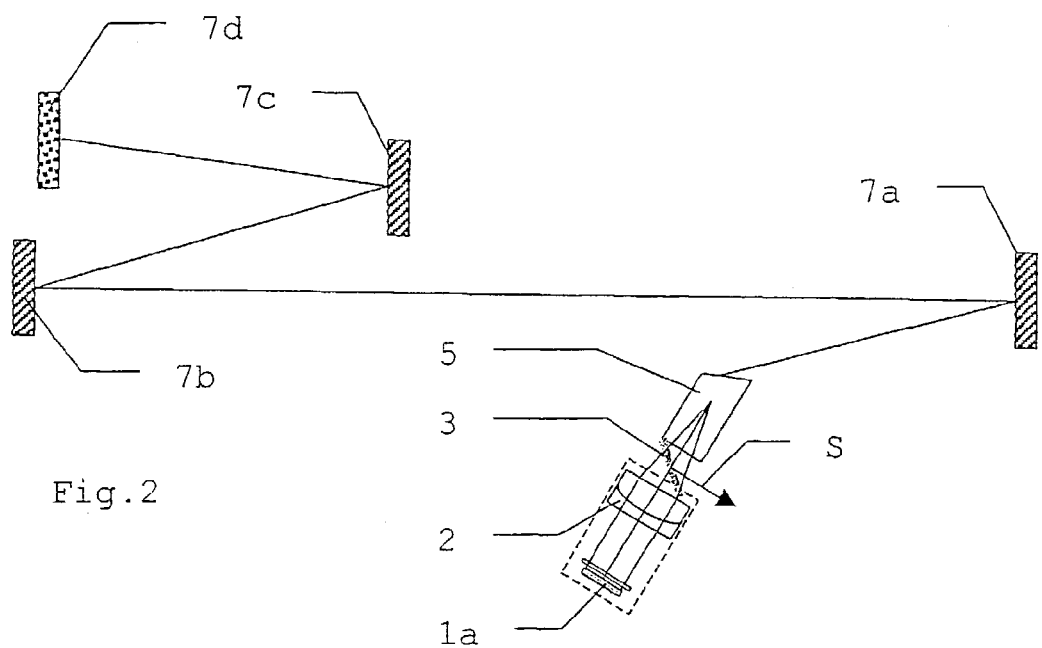
FIG. 2 shows the schematic diagram of an example of a preferred embodiment of the laser according to the invention.

FIG. 2 schematically shows an alternative embodiment which uses the following components:

Pump means: The embodiment described uses a laser diode array 1a, which is focused by means of a transfer optical system 2 and a dichroic mirror 3 into the laser medium 5 and which achieves a pump intensity of about ~20 kW/cm². This can be achieved in a compact manner, for example, by using a pump design as described in PCT Application No. PCT/EP00/05336 of Jun. 9, 2000, U.S. application Ser. No. 60/146,472 of Jul. 30, 1999 and U.S. application Ser. No. 09/489,964 of Jan. 24, 2000, which is hereby considered to have been disclosed in the context of the present invention. The design described there is compact and uses a small number of optical elements focusing the pump light which is emitted by the laser diode array 1a. Alternative realizations use fiber-optic means for inputting the pump light of the laser diodes into the laser medium 5. The design shown in FIG. 2 produces a mode-locked Q-switch laser emission S comprising laser pulses of approx. 5–10 ps duration and having a repetition rate in the vicinity of 1 MHz. This high repetition rate is sufficiently high for many applications and fulfils the needs for the high repetition rates as required for many laser applications and for which the repetition rates of a few tens of kHz of the typical Q-switch laser are not sufficient.

Laser medium: The laser medium 5 used is Nd:vanadate. This medium has a relatively high gain cross-section and also a relatively high small-signal gain which is proportional to the product of life of the upper laser level and effective cross-section of the emission. The small-signal gain determines how fast the pulse build-up takes place within the envelopes generated by the Q-switch. If Nd:vanadate is used, pulse duration of the order of magnitude of a few picoseconds can be achieved owing to the emission bandwidth. However, depending on the respective laser application, other laser media may also be suitable. The neodymium doping of the Nd:vanadate is chosen sufficiently low (e.g. Nd doping <1% for absorbed pump powers of >5 W) so that the absorption length is long enough to avoid destruction of the crystal at full pump power. On the other hand, the doping is chosen sufficiently high (e.g. Nd doping >0.1%) so that a sufficient proportion of the pump light is absorbed in the laser medium. Alternative laser media are Nd:YLF, Nd:YAG, Nd:glasses, Cr:LiSAF, Cr:LiCAF, Cr:LiSGAF, Yb:YAG, Yb:glasses, Nd:vanadate operated for the 917 nm line, Nd:vanadate operated for the 1340 nm line, Nd:YAG operated for the 946 nm line, or any other laser material which has sufficient absorption in a range for which laser diodes are available. Some of these materials have the advantage that they have a laser emission at wavelengths which are substantially shorter than the 1046 nm line of Nd:YAG or of Nd:vanadate, which is particularly useful for some applications.

Laser resonator: A laser cavity having a set of highly reflective laser mirrors 7a–7c is formed, which mirrors are positioned around the laser medium 5 in such a way that the total length of the cavity is about 20 cm, which corresponds to a resonator revolution time of 1.33 ns or a pulse repetition frequency of about 750 MHz. That side of the laser medium 5 which is on the outside relative to the resonator is in the form of a mirror having a reflectivity of 98%, based on the resonator (for 1064 nm) and a transmittance of >90% for the pump light. The distance between this surface of the laser medium 5 and the mirror 7a is 41 mm, the respective distance between the mirrors 7a and 7b or 7b and 7c is 61 mm, and the distance between mirror 7c and SESAM 7d is once again 41 nm. The mirrors 7a to 7c are highly reflective and have the following radii of curvature (ROC):

7a 65 mm with respect to y axis, ∞ with respect to x axis,
7b ∞ with respect to both axes and
7c 100 mm with respect to both axes.

The stated values for the mirrors are to be understood as being specific for the setup shown by way of example and the components used, in particular the laser medium used. Other implementations require other designs.

A guideline for the implementation is to adjust the laser medium and light spot of the pump beam as exactly as possible in order to achieve a maximum amplification. This can be achieved, for example, by an arrangement as described in D. Kopf, K. J. Weingarten, G. Zhang, M. Moser, A. Prasad, M. A. Emanuel, R. J. Beach, J. A. Skidmore, U. Keller, Invited Paper, "High-average-power diode-pumped femtosecond Cr:LiSAF lasers", Applied Physics B, vol. 65, pages 235–243, 1997, which is hereby considered to have been disclosed in the context of the present invention. This laser resonator is extremely compact in comparison with many typical mode-locked laser resonators, which have, for example, a repetition rate of about 80 MHz. If the 20 cm long resonator of this arrangement shown in FIG. 2 is operated in MLQSW mode instead of with the conventional continuous-wave mode-locking, it is still possible, with appropriately high compactness, to achieve peak powers which are of the same order of magnitude as in the case of a continuous-wave mode-locked laser resonator which is about ten times longer. Q-switch mode-locking can just as easily be used as an alternative in a long laser resonator, with the result that higher peak powers are achieved than in the case of corresponding operation with continuous-wave mode-locking.

Saturable absorber: The cavity contains a saturable absorber. For a laser wavelength of 1064 nm, this may be, as represented here by the SESAM 7d, a saturable semiconductor absorber which uses, as a saturable material, indium gallium arsenide which is embedded in a structure of gallium arsenide and aluminum arsenide and which in its totality acts as a saturable absorber mirror (cf. "Semiconductor Saturable Absorber Mirrors (SESAMs) for Femtosecond to Nanosecond Pulse Generation in Solid-State Lasers", Ursula Keller, et al., IEEE Journal of Selected Topics in Quantum Electronics, Vol. 2, No. 3, September 1996). optionally, dielectric coatings can be applied to the surface of the structure, with the result that the saturation parameters and the modulation depth can be influenced. The saturable absorption effect, expressed in units of the modulation depth, can range from fractions of a percent to a few percent of the incident laser light. The modulation depth can be used as a design parameter for designing the final laser parameters, such as, for example, the frequency of the Q-switch pulses, the pulse duration, etc. In the preferred embodiment of FIG. 2, a modulation depth of about 0.5% and a saturation flux of about 100 microjoules/cm$^2$ (+/−50%) are used, which, in the Nd:vanadate embodiment, result in a repetition rate of the Q-switch envelopes of the mode-locked pulses of about 1 MHz.

Alternative optical switches: According to the prior art, saturable absorbers have the advantage of particularly short switching times. In principle, however, other optical switches, such as, for example, mechanical switches, electrooptical switches or acoustooptical switches, can be used for producing a Q-switch. However, the switching times of the mechanical systems are in the microsecond range, so that use for a laser according to the invention currently does not appear possible. On the other hand, the electrooptical switches fully approach the switching times achievable with saturable absorbers, for example with the use of the Pockel or Kerr effect. If a saturable absorber is dispensed with, the mode-locking can also be achieved by active locking or by synchronous pumping. In the case of active locking, a loss modulation is produced by an externally controlled modulator in the vicinity of a resonator mirror. Suitable components are available in the form of electrooptical and acoustooptical modulators. The synchronous pumping is effected, so to speak as a counterpart of the modulation of the losses, by a periodic modulation of the amplification, which can be effected, for example, by synchronous pumping of the laser with the mode-locked pulse series of another laser.

Mode-locked Q-switch (MLQSW) operation of the laser: A saturable absorber having a short relaxation time of the order of magnitude equal to or less than the resonator revolution time, as possessed by most InGaAs/GaAs-based saturable semiconductor absorbers (SESAM), often leads to a mode which is referred to as mode-locked Q-switch. This is a combination of pure mode-locking, in which a stable pulse series having a pulse repetition rate corresponding to the resonator revolution time leaves the laser, and a pure Q-switch, in which giant pulses which are substantially longer than the resonator revolution time form. The mode-locked Q-switch pulse series is a mode-locked pulse series whose envelope is greatly modulated in the form of a Q-switch pulse. This usually undesired effect has the advantage that peak powers which are much higher than those which are achieved by comparable laser resonators with pure Q-switch or pure mode-locking are achieved. Since the mode-locked pulse series is "chopped" and the emission in giant pulses (the term "giant pulse" is used on the basis of the designation of "giant-pulse lasers" for Q-switch lasers, cf. for example F. K. Kneübuhl, M. W. Sigrist, "Laser", [Lasers], page 203, Teubner Studienbücher, Stuttgart, 1991), the peak powers in the MLQSW mode are very much higher, i.e. often up to an order of magnitude, than even the powers achievable in the case of operation with continuous-wave mode-locking. MLQSW can therefore be used for obtaining extremely high peak powers in comparison with mode-locking or the Q-switch for a comparable laser (such as, for example, with the same cavity length). These high peak powers are then suitable in particular for efficient frequency conversion, such as, for example, UV generation. In particular, the generation of harmonics of the third or of a higher order is supported by the high power.

MLQSW laser resonator having high repetition rates of the Q-switch envelope of the mode-locked pulses: MLQSW results in a typical Q-switch pulse frequency which is of the order of magnitude of from a few tens of kHz to the range of 100–200 kHz. Many applications require higher rates. In order to obtain a high pulse repetition rate of the MLQSW laser resonator, the laser cavity can be designed in such a way that the losses during resonator revolutions are low, for example of the order of magnitude of a few percent or even less. In addition, short cavities can substantially increase the repetition rate of the Q-switch envelope of the mode-locked pulses.

Particularly compact MLQSW laser resonators: Many applications require or prefer particularly compact laser designs in which compact and hence short laser resonators are preferred. If such a short laser resonator is exclusively mode-locked, the achievable peak power is, however, lower than in a longer resonator. MLQSW operation can therefore solve the problem of insufficient peak power from short laser resonators for subsequent non-linear applications.

Figure 3:
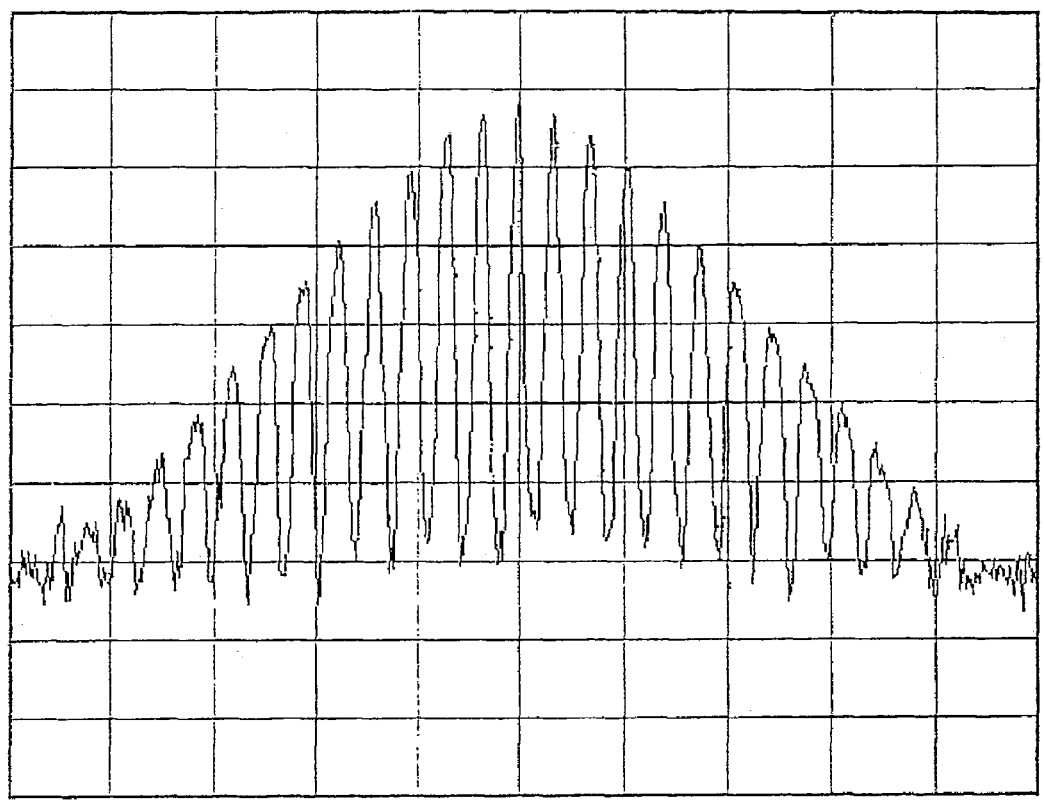

FIG. 3 shows the pulse series of an Nd:YLF MLQSW laser according to the invention, having a design described in FIG. 2. At a pump power of 16 W, a laser output power of 4.02 W is achieved, the Q-switch repetition rate being 350 kHz and the repetition rates of the mode-locking being about 700 MHz. The saturable semiconductor absorber (SESAM) used has a modulation depth of about 0.15% and a saturation flux of about 1 mJ/cm$^2$. The curve was recorded by measuring the photodiode signal, which measures the laser beam and the pulse series, using a Spectrum Analyzer HP E4401 B from Hewlett-Packard as a measuring apparatus.

In the diagram, the frequency spectrum of the photodiode signal is plotted against the frequency in order to illustrate the noise-free MLQSW operation. The mean frequency component of about 705 MHz illustrates the mode-locking repetition frequency corresponding to the resonator revolution frequency. While in pure mode-locking no side bands occurs, strong side bands in this case indicate the Q-switch and the associated strong modulation of the mode-locked pulse series. From the frequency interval of the side bands, the Q-switch repetition rate of 350 kHz can be read. The fact that the frequency components are clearly fully modulated corresponds to noise-free MLQSW operation.

Figure 4:
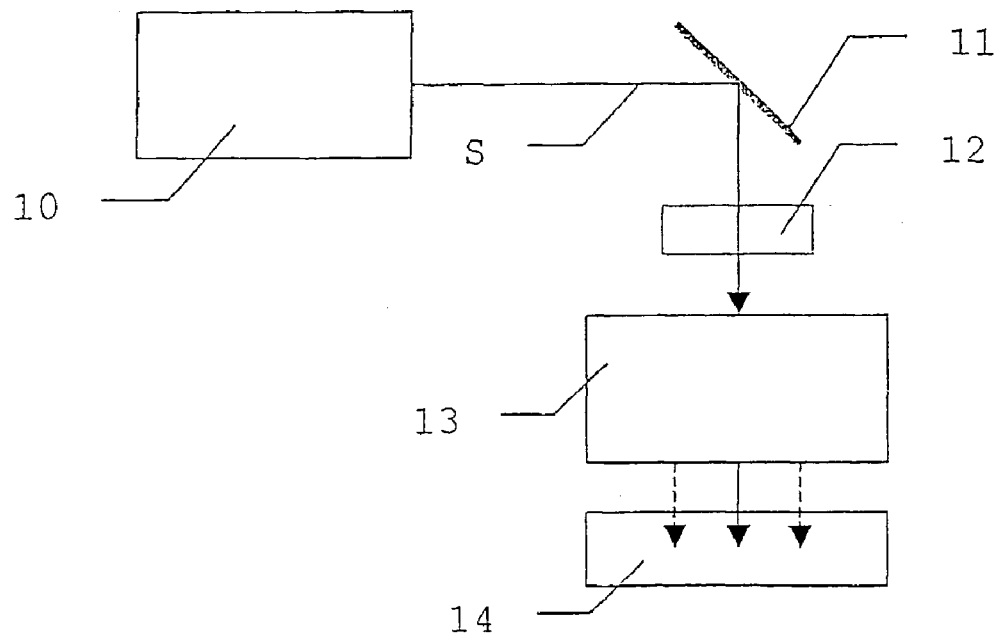

FIG. 4 schematically shows the use of light which is generated by means of a frequency conversion light source according to the invention, according to the basic principle of FIG. 1.

A frequency conversion light source 10 comprising an MLQSW laser source with subsequent frequency conversion to the ultraviolet range produces laser emission S which is inserted into a scan apparatus 13 via a deflection mirror 11 and an optical switch 12, which can be realized, for example, electrooptically or electroacoustically. By means of the scan apparatus, structures are drawn in an absorbing medium, e.g. a UV-sensitive synthetic resin. In interaction with the UV light, the exposed zones change their physical or chemical properties, for example through curing.

Of course, the figures shown represent one of the many embodiments and a person skilled in the art can derive alternative forms for implementing the laser design, for example with the use of other laser media or resonator components. In particular, it is possible to design the pumping of the laser by other methods over and above the examples given or to arrange the necessary components in another manner.

The invention claimed is:

1. A laser for emitting laser pulses having high pulse powers and high pulse rates, comprising
    an amplifying laser medium,
    a laser resonator having at least one resonator mirror and at least one output coupler,
    a pump source for pumping the laser medium and means for producing mode-locking,
wherein
means for producing a Q-switch, in particular having a pulse rate of above 100 kHz, are present and
the pump source has a power of at least 5 W for pumping the laser medium.

2. The laser as claimed in claim 1,
wherein
the means for producing mode-locking are designed in such a way that the pulse rate of the mode-locking is of the order of magnitude of from 2.5 MHz to several GHz.

3. The laser as claimed in claim 1,
wherein
the length of the laser resonator is less than 0.75 m.

4. The laser as claimed in claim 1,
wherein
the means for producing a Q-switch have at least one electrooptical or acoustooptical switch.

5. The laser as claimed in claim 1,
wherein
the means for producing the mode-locking have at least one active, externally controlled modulator or, in combination with the pump source, are designed for synchronous pumping.

6. The laser as claimed in claim 1,
wherein
the means for producing a Q-switch and/or the means for producing the mode-locking have at least one saturable absorber.

7. The laser as claimed in claim 6,
wherein
the saturable absorber consists of semiconductor material which comprises at least one of the following materials
    indium gallium arsenide
    gallium arsenide
    aluminum arsenide
    indium gallium arsenide phosphide.

8. The laser as claimed in claim 6,
wherein
the saturable absorber has dielectric coatings on at least one of its surfaces.

9. The laser as claimed in claim 6,
wherein
the saturable absorber has a relaxation time less than or equal to the resonator revolution time.

10. The laser as claimed in claim 6,
wherein
the saturable absorber has a modulation depth of from 0.1% to 10% and a saturation energy flux of 20–2000 microjoules/cm$^2$, preferably of 100 microjoules/cm$^2$.

11. The laser as claimed in claim 6,
wherein
at least one resonator mirror is in the form of a saturable absorber.

12. The laser as claimed in claim 1,
wherein
the means for producing a Q-switch and the means for producing mode-locking are combined in one component.

13. The laser as claimed in claim 1,
wherein
the laser medium comprises one of the following materials
    Nd: vanadate,
    Nd: YLF,
    Nd: YAG,
    Nd: glass,
    Cr: LiSAF,
    Cr: LICAF,
    Cr: LiSGAF,
    Yb: YAG,
    Yd: KGW,
    Yb: KYW or
    Yb: glass.

14. The laser as claimed in claim 1,
wherein
the pump source comprises at least one laser diode or a laser diode array.

15. A method for utilizing non-linear optical effects with a laser as claimed in claim 1, comprising at least one of:
    frequency multiplication,
    two-photon or multiphoton absorption effects, and
    optical parametric generation, oscillation or amplification.

16. A frequency conversion light source comprising
    a laser for emitting pulsed laser light having high pulse powers and high pulse rates, comprising
        an amplifying laser medium,
        a laser resonator having at least one resonator mirror and at least one output coupler,
        a pump source for pumping the laser medium and means for producing mode-locking;
    means for frequency conversion of the laser light,
wherein
    means for producing a Q-switch, in particular having a pulse rate above 100 kHz, are present.

17. The frequency conversion light source as claimed in claim 16,
wherein
the pump source has a power of at least 5 W for pumping the laser medium.

18. The frequency conversion light source as claimed in claim 17,
wherein
the means for producing mode-locking is designed so that the pulse rate of the mode-locking is of the order of magnitude of from 2.5 MHz to several GHz.

19. The frequency conversion light source as claimed in claim 16,
wherein
the length of the laser resonator is less than 0.75 m.

20. The frequency conversion light source as claimed in claim 1,
wherein
the means for producing a Q-switch have a least one electrooptical or acoustooptical switch.

21. The frequency conversion light source as claimed in claim 16, wherein
the means for producing the mode-locking have at least one active, externally controlled modulator or, in combination with the pump source, a design to give synchronous pumping.

22. The frequency conversion light source as claimed in claim 16,
wherein
the means for producing a Q-switch and/or the means for producing the mode-locking have at least one saturable absorber.

23. The frequency conversion light source as claimed in claim 16,
wherein
the saturable absorber consists of semiconductor material which comprises at least one of the following materials
indium gallium arsenide
gallium arsenide
aluminum arsenide
indium gallium arsenide phosphide.

24. The frequency conversion light source as claimed in claim 16,
wherein
the saturable absorber has dielectric coatings on at least one of its surfaces.

25. The frequency conversion light source as claimed in claim 16,
wherein
the saturable absorber has a relaxation time of less than or equal to the resonator revolution time.

26. The frequency conversion light source as claimed in claim 16,
wherein
the saturable absorber has a modulation depth of from 0.1% to 2% and a saturation energy flux of about 100 microjoule/cm$^2$.

27. The frequency conversion light source as claimed in claim 16,
wherein
at least one resonator mirror is in the form of a saturable absorber.

28. The frequency conversion light source as claimed in claim 16,
wherein
the means for producing a Q-switch and the means for producing mode-locking are combined in one component.

29. The frequency conversion light source as claimed in claim 16,
wherein
the laser medium comprises one of the following materials
Nd: vanadate,
Nd: YLF,
Nd: YAG,
ND: glass,
Cr: LiSAF,
Cr: LiCAF,
Cr: LiSGAF,
Yb: YAG,
Yb: KGW,
Yb: KYW or
Yb: glass.

30. The frequency conversion light source as claimed in claim 16,
wherein
the pump source comprises at least one laser diode or a laser diode array.

31. The frequency conversion light source as claimed in claim 16,
wherein
the means for frequency conversion have elements with non-linear optical effects, in particular comprising $KnbO_3$ [sic], $BaB_2O_4$ (BBO), $LiB_3O_5$ (LBO) or $CsLiB_6O_{10}$ (CLBO).

* * * * *